July 11, 1961 N. O. YOUNG 2,991,772
FREE-PISTON COMPRESSED GAS GENERATORS
Filed Sept. 12, 1958 4 Sheets-Sheet 1

Inventor
Niels O. Young
By
Gerald Altman
Attorney

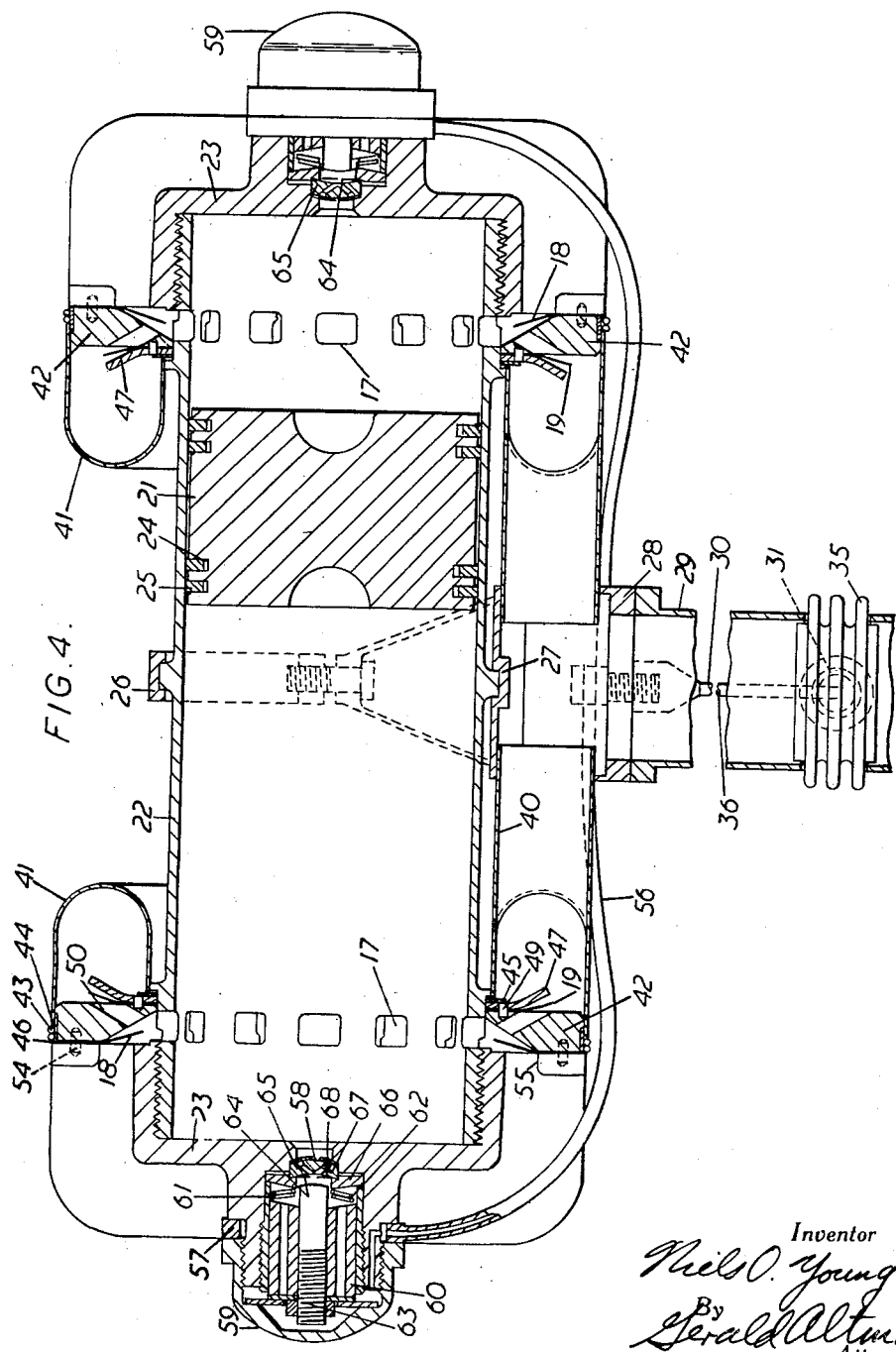

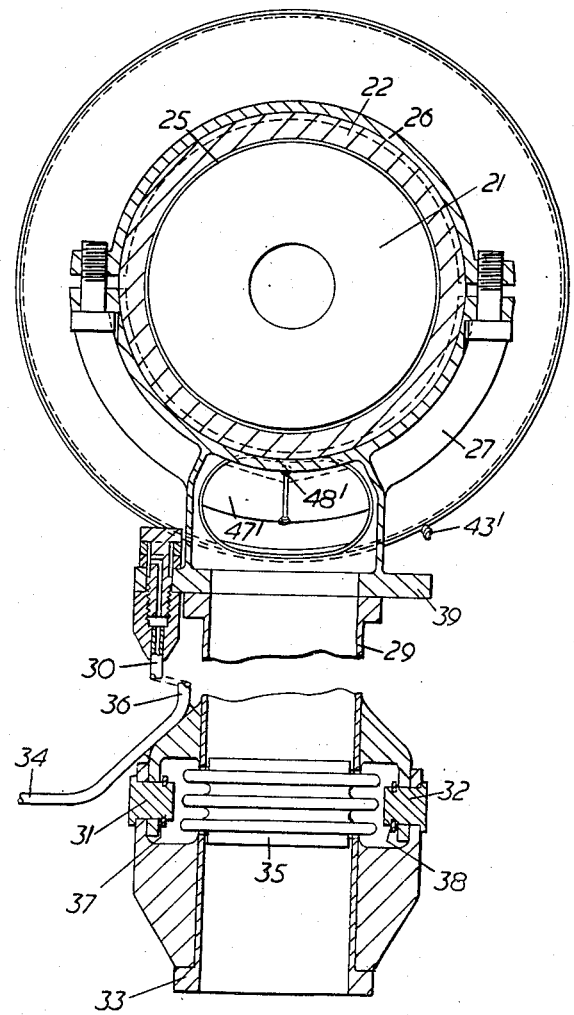

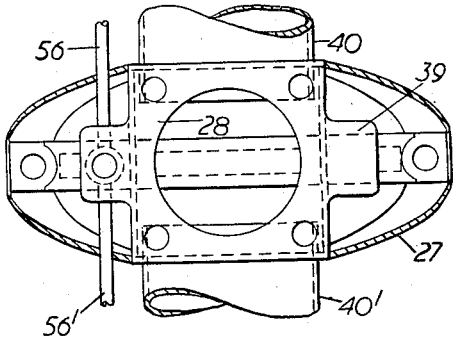
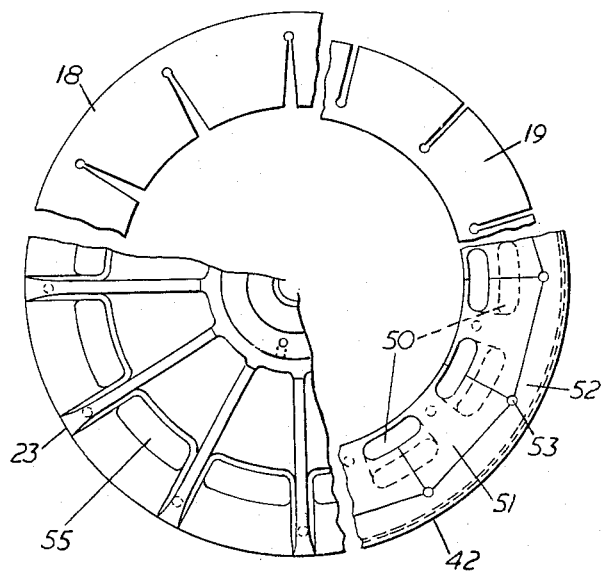

United States Patent Office 2,991,772
Patented July 11, 1961

2,991,772
FREE-PISTON COMPRESSED GAS GENERATORS
Niels Owen Young, 17 Forest Road E.,
Nottingham, England
Filed Sept. 12, 1958, Ser. No. 760,794
9 Claims. (Cl. 123—46)

The present invention concerns an integrally combined engine-compressor unit which may, as a source of compressed gas, be used for starting gas turbines, or be used for providing compressed gas for conversion into mechanical power such as by expansion in a turbine or reciprocating machine, or be used to produce propulsive forces by expansion of the compressed gas in a nozzle.

While known free-piston gas generators might be proposed for these applications, their relative complication and weight are disadvantageous.

It is a purpose of the present invention to provide a new or improved free-piston compressed gas generator in which these disadvantages are reduced.

According to the present invention a source of compressed gas is proposed in which the functions of a diesel cycle and of an air compressor are combined in a single cylinder of uniform diameter in which oscillates a single free piston. The present free-piston compressed gas generator employs a diesel cycle, which may be naturally aspirated, and which both drives and exhausts into an air compressor. Thus, the present free-piston compressed gas generator delivers a flow of mixed combustion products and air at greater than atmospheric pressure. Consisting of a single free piston moving within a cylinder having two closed ends or cylinder heads, the present free-piston compressed gas generator is not balanced in the usual sense that the cylinder remains fixed. Both the cylinder and the piston are allowed to oscillate substantially freely about their common mass-center, which mass-center remains substantially fixed with respect to a mounting. Synchronization of the valves and of the fuel injectors is not necessarily done by means of mechanical linkages, but by making use of intertial and/or gas pressure forces.

Known free-piston compressed gas generators obtain mechanical balance by means of linkages which connect the two pistons so that they are forced to move in identical phase, but in opposite directions. Although the linkage which maintains synchronization of the two pistons is useful for other purposes than balancing, good designs minimize the forces which it transfers. The two pistons are nearly always each of stepped diameters so that, for example, a choice of the relative volumes swept by the engine and by the compressor can be made. In addition, the piston diameter is stepped so that the two pistons will rebound after the power stroke in the engine occurs, by means of dummy air volumes, cushions, or bounce chambers between the larger piston diameter and a bounce chamber cylinder head. The mean gas pressure within the two bounce chambers, as well as their relative volumes, are regulated during running so that, for example, the pistons will experience approximately equal and opposite accelerations. Free-piston compressed gas generators of known types usually require external blowers or equivalent means for scavenging the cylinder which performs the engine cycle. It is seen that in a known design of a free-piston compressed gas generator such as the one outlined here, that the pistons are not actually free, but are constrained by the linkage connecting them, and also by the bounce chambers to oscillate in a fixed relationship with respect to the fixed cylinders.

Many aspects of known free-piston compressed gas generators require unusual scrutiny during design, such as to insure the concentricity of the stepped free pistons as well as the concentricity of the cylinder bores in which they run.

It is the purpose of the present invention to obviate the problems of concentricity which would arise during manufacture of a free-piston compressed gas generator of a conventional type, and during running of such compressed gas generators due to thermal distortion.

It is a further purpose of the present invention to employ a piston which is not constrained in its motion by bounce chambers, or by any mechanical linkages attached to it. The piston is constrained mechanically only to motion which is parallel to the axis of the cylinder.

It is a further purpose of the present invention to provide a free-piston compressed gas generator using but a single free piston, and in which no special means for scavenging need be provided.

It is a purpose of the present invention to provide a single free-piston compressed gas generator in which balancing with respect to fixed mountings is achieved by allowing both the piston and the cylinder to oscillate. The cylinder and any accessories which may be attached to it thus oscillate with respect to the fixed mounting under suitable and small elastic constraints.

It is a further purpose to provide a single free-piston compressed gas generator in which gas pressure or inertial forces are employed to operate the valves which admit and/or deliver gas from either the engine or the compressor phase of the cycle, or both.

It is a further purpose to provide a single free-piston compressed gas generator in which gas pressure and/or inertial forces are employed to operate the fuel injector for the diesel cycle.

Other objects of the invention will appear from the example of the invention illustrated in the accompanying drawings, in which:

FIGURE 4 is a longitudinal section of the free-piston compressed gas generator in the plane of the axis of the cylinder and the axis of the delivery tube;

FIGURE 5 is a cross-section of the free-piston compressed gas generator in a plane normal to the axis of the cylinder and containing the axis of the delivery tube;

FIGURE 6 is a view of the manifold assembly as it would be seen along the axis of the delivery tube;

FIGURE 7 is a composite drawing showing sectors of the various parts which comprise the valve assembly as they would be seen along the cylinder axis.

The way in which a free-piston compressed gas generator according to the present invention produces compressed gas will first be described with reference to a generalized or schematic design. It will be appreciated that while the cycle of operations upon the gas is unique, the actual design of a free-piston compressed gas generator using such a cycle can take a number of forms. What is believed to be the most satisfactory of these forms will be described in detail.

Figure 1:
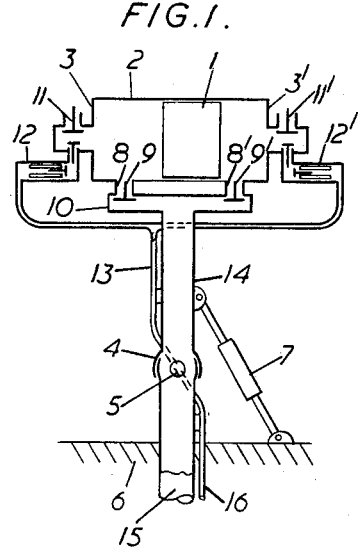
FIGURE 1 is a diagrammatic section through the compressed gas generator taken on the center line of the cylinder.

A generalized or schematic design of a free-piston compressed gas generator according to the present invention is shown in longitudinal section in FIGURE 1. The free-piston compressed gas generator is seen to comprise a double-ended free-piston 1 which may be symmetrical about its midpoint, and which is free to slide within a cylinder 2, double-ended and of uniform bore. The cylinder and accessories which may be attached to it can be arranged symmetrically with respect to a plane normal to and bisecting the cylinder axis.

In operation, the piston oscillates between two opposing cylinder heads, a left-hand cylinder head 3 and a right-hand cylinder head 3'; alternately forming, at the extremes of its travel, a clearance space or the inner dead-point for the diesel or compression-ignition cycle occurring to the left of the piston, and then the clearance space or inner dead-point for the compression-ignition cycle occurring to the right of the piston. Thus, the inner dead-point of the compression-ignition cycle to the left of the piston corresponds to the outer dead-point of the compression-ignition cycle to the right of the piston, and vice versa.

The piston can be seen to divide the cylinder into two chambers, one on either side of the piston. The difference in gas pressure between these two chambers accelerates the piston, and, acting equally upon the cylinder heads during running of the free-piston compressed gas generator, is allowed to accelerate the cylinder substantially without restraint. In the design shown in FIGURE 1, then, the cylinder oscillates along an arc of a circle centered upon a pivot 5. The pivot 5 is in turn attached by means of a delivery tube 15 to a relatively fixed or stationary support 6. A minimum of vibration or oscillatory forces are transmitted to the fixed support because the pivot 5 is located effectively at the center of percussion of the compressed gas generator.

A weak elastic constraint upon the excursions of the cylinder of the free-piston compressed gas generator may be included as a spring or elastic element 7 which links the compressed gas generator to the stationary support 6. The compressed gas generator will have a natural frequency of oscillation with respect to the fixed support when such a spring or elastic element is used. A lower limit to the natural frequency would be determined, for example, by the directions and magnitudes of the accelerations which would be imposed upon the mounting in mobile applications. An upper limit to the natural frequency is set by the frequency of the gas generator operation itself, which would in general exceed that of the mounting.

It is understood that the nodal mounting described for isolation of the motion of the cylinder of the compressed gas generator from its surroundings is not necessarily unique nor optimal in the form described. It may be preferable to allow the cylinder of the compressed gas generator freedom to oscillate along a straight path rather than along an arc of a circle, or along some other curve. It is essential, however, in a free-piston compressed gas generator according to the present invention, that the cylinder oscillate relatively freely; as required by the inertia operated accessories and for successful vibration isolation.

The cycle of operations which the air and fuel undergo will be described in detail. It can be seen in FIGURE 1 that no buffers, or bounce chambers, are used. Instead, the piston rebounds from the compression-ignition power stroke itself; first from one cylinder head, then from the other. The volume which contains the compression-ignition cycle providing this augmented bounce lies between the cylinder head 3 and an outlet port 8 for the cycle occurring in the volume to the left of the piston, and between the cylinder head 3' and an outlet port 8' for the cycle to the right of the piston. Owing to the symmetry of the free-piston compressed gas generator already noted, these volumes are substantially equal. Non-adiabatic processes such as would dissipate energy in ordinary bounce chambers cannot arise, since there are no bounce chambers as such. The augmented bounce provided by the two opposed compression-ignition cycles replaces the bounce chambers which might otherwise be used.

The right-hand and left-hand ports, 8' and 8 respectively, each communicate with an outlet valve 9' and 9 respectively. Gases may leave the volume between the cylinder head and piston whenever the piston opens the port 8 or 8', and when the gas pressure within that port sufficiently exceeds the pressure within a common delivery manifold 10 to open the outlet non-return valves 9 and 9'. While the outlet non-return valves 9 and 9' may be non-return valves which are operated by a pressure difference, they can also be assisted by inertia forces arising from the accelerations of the cylinder of the free-piston compressed gas generator.

A left-hand non-return inlet valve 11 and a right-hand non-return inlet valve 11' are provided. The inlet non-return valves 11 and 11' can also be assisted by inertia forces as is the case with the outlet valves. The left-hand inlet valve 11 is designed to open and to admit air substantially whenever the gas pressure between the piston and the left-hand cylinder head 3 falls sufficiently below atmospheric pressure. Likewise, inlet valve 11' opens and admits air whenever atmospheric pressure sufficiently exceeds the pressure within the right-hand portion of the cylinder, between the cylinder head 3' and the right-hand face of the free-piston 1.

In a free-piston compressed gas generator according to the present invention, the air inlet valve may in general communicate with the contents of the cylinder from any position in the cylinder head, or, may communicate through a port opening into the cylinder at any axial position along the cylinder, provided that the pressure within the cylinder cannot fall greatly below atmospheric pressure without air entering through an inlet valve.

In the diagram of FIGURE 1 all of the gas valves are shown oriented such that inertia forces due to accelerations of the cylinder of the compressed gas generator would be a minimum.

A combined fuel injector, fuel pump, and spray nozzle are indicated in FIGURE 1 as a left-hand fuel injector unit 12 and a right-hand fuel injector unit 12'. These injector units, shown attached to the cylinder heads, are designed to operate largely by inertia forces. Thus, when the gasifier cylinder is accelerating away from the piston, due to momentarily high gas pressure between the two, the injector unit at that end of the cylinder discharges.

It is seen in FIGURE 1 that the two injector units are each connected to a common fuel supply tube 13, which, by means of having a flexible section or a suitable fluid-tight articulation, communicates to a section 16 of the fuel supply tube which is fixed to the stationary support 6. The outlet gas delivery manifold 10 communicates with a delivery tube 14. The delivery tube 14 is in turn connected by means of a flexible seal or other suitable gas-tight articulation 4 to the section 15 of the delivery tube which is fixed to the stationary mounting 6.

Figure 2:
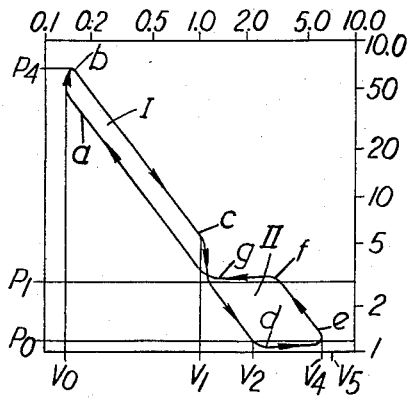
FIGURE 2 is an indicator diagram illustrating the cycle of operations performed upon the gas in one end of the cylinder drawn on logarithmic coordinates.

FIGURE 2 illustrates on log-log coordinates the pressure and volume changes characteristic of a complete cycle within one end of the cylinder, say the left-hand end. A similar cycle takes place on the other side of the piston, in the right-hand chamber, but in opposite phase.

At point (a) while the volume is approaching a minimum of $V_0$, consider that fuel is injected. Subsequent compression-ignition, followed by combustion, raises the pressure between the piston and its cylinder head to a point (b). During this process, the acceleration experienced by the cylinder, being proportional to the pressure, rises to a peak $P_4$, and the inertia operated injector unit may well complete its delivery of fuel.

From point (b) the piston and cylinder accelerate apart, expanding the gas between them substantially adiabatically until the exhaust port 8 shown in FIGURE 1, for example, is exposed by motion of the piston at a volume $V_1$. At a point (c) then, the pressure within the cylinder is relieved by sudden release of gas into the outlet manifold through the port 8 and the outlet valve 9. As a result, the pressure within the cylinder drops to a point ($g$) slightly above that pressure originally within the manifold or, slightly above the delivery pressure $P_1$.

From point ($g$) the remaining combustion products expand further until the cylinder pressure drops to or slightly below atmospheric pressure $P_0$ at a point ($d$).

At point ($d$) the inlet valve 11 opens, and a new charge of air enters. Entering, the pressure within the cylinder may remain approximately constant until the end of the inlet stroke is reached at point ($e$). The maximum volume, when the piston is at the end of its travel, is at $V_4$. At the point ($e$), the inlet valve closes.

Meanwhile, a similar cycle in opposite phase has been occurring on the opposite face of the piston, and forces the piston to reverse. Reversing, the piston compresses combustion products and air until the pressure reaches or exceeds the delivery pressure $P_1$ within the manifold. Thus, at a point ($f$) the outlet valve opens again, and gas is ejected from the left-hand chamber at a substantially constant pressure slightly exceeding the delivery pressure $P_1$. This flow of compressed gas into the manifold 10 continues until the outlet port 8 is obstructed by the piston at a volume $V_1$. The compressor cycle is now completed. As the volume further decreases, the pressure rises substantially adiabatically until it is again adequate for compression-ignition, at a volume which is approaching the minimum volume $V_0$. At a suitable point ($a$), the injector unit again trips and discharges, thus completing the cycle of the free-piston compressed gas generator.

Examination of the cycle of the free-piston compressed gas generator according to the present invention shows that it is made up of two parts: an engine cycle (I) joined to a compressor cycle (II) at the point ($g$). It is clear that area (I) must be at least as great as the area enclosed by the compressor cycle (II). In general the excess area of the engine cycle will be needed as power to overcome mechanical and fluid friction, dissipation in the mounting, and in powering those accessories which are inertially operated and which are attached to the free-piston compressed gas generator.

In a free-piston compressed gas generator according to the present invention, the desired output is a flow of compressed gas. Thus, the engine output, proportional to area (I) need not exceed the compressor dissipation, proportional to area (II) by more than enough to preserve steady-state running conditions of the compressed gas generator. Should the engine output become relatively excessive, due to a change of running conditions, the mass of fuel injected or the delivery pressure can be changed so that undesirably high peak pressures can be avoided.

Under given running conditions, then, there is an optimum design value for the position of the outlet port. This position can be measured by K, the porting ratio:

$$K = V_5/V_1, \text{ where } V_5 = V_4 + V_0$$

The value of K which is chosen for the design of a free-piston compressed gas generator according to the present invention depends, for example, upon the following running conditions:

$p = P_1/P_0$, the gas generator overall pressure ratio;
$r = V_2/V_0$, the engine volumetric compression ratio;
$x =$ the fraction of stoichiometric proportions burned in the engine cycle;
$n =$ the ratio of the indicating compressor power, area (II) to the indicated engine power, area (I).

Figure 3:
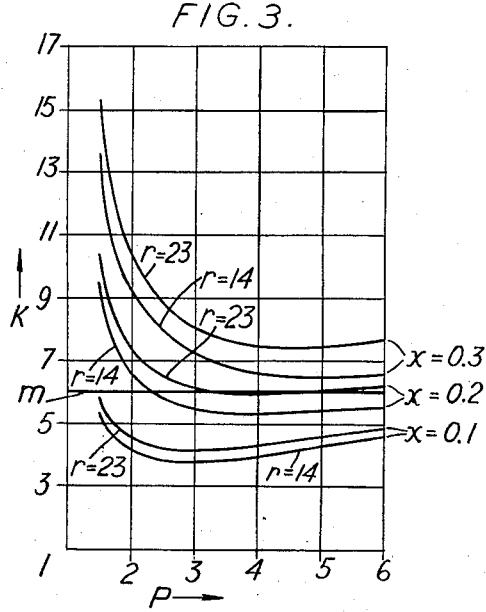
FIGURE 3 is a graph showing how the porting ratio K, a measure of the cylinder length, depends upon the pressure ratio $p$, a measure of the delivery pressure, and upon the other parameters $x$ and $r$.

The graph of FIGURE 3 shows the dependence of the porting ratio K upon the running conditions enumerated above, and is for $n = 0.70$. Such a family of curves shows that the porting ratio K need not exceed 20; and for compactness of combustion chamber shape would in most cases be designed at less than 10.

A line ($m$) has been drawn in FIGURE 3 to represent a constant value of $K = 6.0$, a porting ratio which could well be chosen for the design of a free-piston compressed gas generator. It is seen that a gas generator having this porting ratio could be run at any pressure ratio $p$ within the range shown by adjustment of $x$, the stoichiometric fraction in the engine cycle. In applications of the free-piston compressed gas generator it may well be useful to vary the pressure ratio so as to deliver at a variety of pressures $P_1$ while keeping the inlet pressure $P_0$ substantially constant. Alternatively, it may be desired to throttle the free-piston compressed gas generator so that $P_0$ takes on various values while maintaining the delivery pressure $P_1$ substantially constant. Finally, any reasonable combination of pressures $P_1$ and $P_0$ could be used provided that their ratio $p = P_1/P_0$ lies within the range of about 1.5 to 6.0. The upper limit for $p$ is largely determined by the temperatures at which the outlet valves would function reliably. The lower limit for $p$ would usually be determined by the requirement to keep the free-piston compressed gas generator short, with a satisfactory combustion chamber shape, and to have porting ratios K of less than 20.

A specific design for a free-piston compressed gas generator according to the present invention is shown in the FIGURES 4, 5, 6, and 7. In this design the porting ratio K has been fixed at 7.5. It is seen that there are a number of openings, such as 17 in FIGURE 4 which act together to form a port. Further, the port so formed is common to both an inlet reed-valve 18 and to an outlet reed-valve 19.

A design for an inertia operated injector unit is also drawn out in detail. It is understood that this is not the only form which such an injector unit could take, but is intended to illustrate a workable injector unit whose operation will be described.

In FIGURE 4 a longitudinal section of a free-piston compressed gas generator according to the present invention is shown. Due to symmetry, parts on the righthand end, when given identification, use the same numeral as that of the corresponding part on the left-hand end, but primed.

A single free-piston 21 is shown bearing a number of sealing rings such as 25, in annular grooves such as 24, which may be of a conventional type used in the construction of internal combustion engines. The free-piston 21 is free to move axially within a cylinder 22 of the compressed gas generator, and would normally be limited in the amplitude of its excursions to and fro by the pressure of gas within the clearance spaces; which on the left-hand end is formed between the piston 21, the cylinder 22, and a left-hand cylinder head 23.

The cylinder 22 of the free-piston compressed gas generator has a centrally located collar to which a half-ring 26 and an output manifold assembly 27 are bolted. The output manifold assembly 27 is integral with an output tube 29, and a fuel supply tube 30 is attached by means of a banjo fitting. The outlet tube 29 extends a suitable distance away from the axis of the cylinder 22, and terminates in a yoke, best seen in FIGURE 5, carrying a pair of coaxial pivots 31 and 32. The fuel supply tube 30 also extends as far as the yoke, to which it is fastened for example by welding near the point 36. The fuel supply tube extends away from the yoke, coaxially with the pivots 31 and 32, and may be fixed to a stationary support at a convenient position past a point 34. The pivots 31 and 32, retained each by a snap-ring, 37 and 38 respectively, form the axis about which the compressed gas generator oscillates during running, and also hold a metal flexible bellows gas seal 35 in position. Finally, the compressed gas generator may be mounted upon a stationary support by means of bolts or similar means extending into a base flange 33 through which the output of compressed gas is delivered.

A boss 39, integral with an output manifold flange 28, is provided for the attachment of accessories not shown, and especially the attachment of weights so that the center of mass of the compressed gas generator lies within a plane passing through the cylinder axis and also through the common axis of the pivots 31 and 32.

Referring again to the outlet manifold 27, best seen in FIGURE 4, it is seen to be supplied with compressed gas by an oval, tubular extension 40 from the left, and a corresponding extension from the right. The tubular extension 40 is integral with an annular outlet chamber 41 formed of sheet metal. The tubular extension 40 of the outlet chamber rests within an oval hole in the outlet manifold with just enough clearance to allow sliding rather than build-up of inertial or thermal stresses. The outlet chamber 41 is retained against a shoulder machined in the outer surface of the cylinder, fixed under a shoulder on a common valve plate 42, by a peripheral zone of the inlet valve 18, and by radial compression exerted by a pair of looped and twisted wires 43. A narrow circumferential strip of sheet metal 44 is spot welded to the inside of the end of the outlet chamber in order that the outlet chamber should latch over the common valve plate 42 upon assembly.

The valves are all shown as mounted and retained under axial compression between the inner flange of the outlet chamber 41 and a surface 46 machined in the cylinder head 23. It is also to be noted that all the valves are drawn in a half-open position. To obtain the correct axial compression, an annular shim or shims 45 are inserted between the shoulder on the cylinder and an outlet valve stop 47. FIGURE 5 shows how the right-hand outlet valve stop 47' can be made from a dissected ring of metal sheet, welded, and provided with a number of axial registration holes such as 48'.

A number of registration pins such as 49 are inserted in holes in the outlet valve stop 48, and serve to align both the outlet valve 19 and the common valve plate 42. These registration pins are confined against excessive axial movement owing to accelerations of the free-piston compressed gas generator by the shim or shims 45, and blind holes in the common valve plate 42.

The purpose of the outlet valve stop 47 is both to restrain the outlet valve 19, made of thin sheet metal, against deflections beyond its elastic limit, and to act as a heat sink at the moment the outlet valve first opens to release engine exhaust gas. By means of its intermittent thermal contact with the outlet valve stop 47 the temperature of the outlet valve need not deviate far from the mean temperature of the gas within the outlet chamber 41.

The outlet valve 19 is seen in FIGURE 7 to be a dissected ring, which may be cut from a single sheet of thin metal. Its inner diameter matches that of the inner diameter of the outlet valve plate, and it is divided into a number of radial sectors by cuts. At the end of each cut is an axial registration hole, which also serves to relieve stresses which would otherwise build up at the end of the cut due to flexing of the valve.

A number of slots such as 50 are milled into the common valve plate 42 as can be seen in FIGURE 7. These slots conduct gas from the common port comprising the plurality of holes such as 17, to one side of the outlet valve 19. The outlet valve 19 is normally seated, and hence closed by being in contact with the flat surface of the common valve plate 42. When the outlet valve opens due to a pressure excess on the side facing the cylinder contents, the slots of which 50 is one, are the channels through which compressed gas is delivered. The other side of the common valve plate is machined into a truncated polygonal pyramid, having therefore a number of flat faces such as 51, which act as stops against overtravel of the inlet valve. Truncating the concave polygonal pyramid surface of the common valve plate is a flat surface 52 against which the inlet valve 18 is axially compressed, and in which are a number of blind axial registration holes such as 53.

The inlet valve 18 as shown in FIGURE 7 can be made of a thin sheet metal sheet dissected by a number of radial slots each terminating in a registration hole. By means of a number of registration pins such as 54, extending into the blind holes in the cylinder head 23, and into the common valve plate, are restrained against undue axial play under the accelerations of the cylinder of the compressed gas generator due to its to and fro movement.

It is seen in FIGURE 4 that the inlet valve 18 seats upon a flat annular surface on the cylinder head, and is exposed to the atmosphere through a number of slots such as 55 which may be cored holes in the case that the cylinder head 23 is a casting. When the inlet valve is seated against the annular surface of the cylinder head it is set back from the plane of the common inlet ports 17 so that the inner edge of the inlet valve is not exposed to riffling when the cylinder is exhausting.

The cylinder head 23 carries an inertia operated fuel injector unit which is supplied with fuel by means of a fuel tube 56 terminating at the injector unit by means of a banjo fitting 57. The fuel injector unit lies approximately within a volume between a nozzle 58 and an end cap 59. The fuel, which can be supplied to the injector unit at a pressure which need not exceed a few tens of atmospheres, is pumped by the axial motions of an injector bob 60 with respect to the cylinder head 23. The injector bob 60 is perforated by a number of paraxial holes, so that fuel completely fills the volumes at either end at substantially equal pressure. The motions of the injector bob under accelerations of the cylinder of the free-piston compressed gas generator are determined by the design of a set of coned disc springs 61 and 62 which restrain it axially. The injector bob 60 can be so restrained by means of these coned disc springs that it plunges to the right when the cylinder acceleration, due to compression of gas in the left-hand chamber, exceeds a predetermined value. The acceleration at which the bob releases is chosen, for example, for suitable timing of the engine combustion. This acceleration is in general less than the peak acceleration since there is always a lag in compression ignition, and because ignition should not occur unduly ahead of the inner dead-point at the volume $V_0$.

Screwed and locked into the bob 60 by means of a nut is an injector ram 63, whose right-hand end is optically worked into a convex spherical surface. When the bob plunges to the right, this ram is driven into a plane-parallel polished metallic annulus 64 which normally stands clear of the optically worked concave surface of a plug 65. The radius of curvature of the plug may exceed that of the ram by the thickness of the annulus 64. The annulus 64 is pressed into contact with the plug 65 on a peripheral zone which acts as a hydraulic seal by means of a clamp assembly 66. Thus, when the ram is driven into the annulus 64, fuel is trapped in the lenticular volume between 64 and 65 by closure of the central hole in the annulus 64. Fuel is then expelled into a hole or holes such as 67 within the plug, upon further movement of the bob, and fuel moves toward an annular recess cut into the otherwise optically worked convex spherical surface of the plug.

Pressed into contact with an outer zone of the plug is an injector annulus 68. When fuel is driven into the annular recess of the plug by means of the ram 63 in the manner described above, the injector annulus separates from being in contact with the surface of the plug 65. Upon formation of a crevice between the annulus 68 and the surface of the plug, the fluid seal is broken, and fuel flows radially inward following the convex curve of the plug. As the radial inward flow of fuel approaches the axis, it forms into a jet and sprays fuel to the right. A similar fuel spray could be formed by a conventional injector nozzle having a much smaller and more easily contaminated hole than that which is described.

What I claim is:

1. A free-piston compressed gas generator comprising a base, cylinder means on said base defining a chamber having an axis, piston means reciprocable within said chamber along said axis between a first portion of said chamber and a second portion of said chamber, first exhaust means, first air inlet means and first fuel injection means communicating with said first portion of said chamber, second air inlet means, second injection means and second exhaust means communicating with said second portion of said chamber, and control means for sequencing the operation of said means in synchronism with cycles of first and second strokes of said piston means, said control means causing said first exhaust means, said first air inlet means and said first fuel injection means to operate in sequence during a cycle of one of said first and one of said second strokes in sequence and causing said second exhaust means, said second air inlet means and said second fuel injection means to operate in sequence during a cycle of one of said second and one of said first strokes in sequence, said cylinder means being constrained for reciprocable portion on said base.

2. A free-piston compressed gas generator comprising cylinder means defining a chamber having an axis, piston means reciprocable within said chamber along said axis between a first portion of said chamber and a second portion of said chamber, first exhaust means, first air inlet means, first fuel injection means and first exhaust means communicating with said first portion of said chamber, second air inlet means, second fuel injection means and second exhaust means communicating with said second portion of said chamber, and control means for sequencing the operation of said means in synchronism with cycles of first and second strokes of said piston means, said control means causing said first exhaust means, said first air inlet means and said first fuel injection means to operate in sequence during a cycle of one of said first and one of said second strokes in sequence and causing said second exhaust means, said second air inlet means and said second fuel injection means to operate in sequence during a cycle of one of said second and one of first strokes in sequence, said first fuel injection means and said second fuel injection means being inertially actuated.

3. A free-piston compressed gas generator comprising base means, cylinder means constrained for motion on said base means defining a chamber having an axis, piston means reciprocable within said chamber along said axis between a first portion of said chamber and a second portion of said chamber, first exhaust means, first air inlet means, first fuel injection means and first exhaust means communicating with said first portion of said chamber, second air inlet means, second fuel injection means and second exhaust means communicating with said second portion of said chamber, and control means for sequencing the operation of said means in synchronism with cycles of first and second strokes of said piston means said control means causing said first exhaust means, said first air inlet means and said first fuel injection means to operate in sequence during a cycle of one of said first and one of said second strokes in sequence and causing said second exhaust means, said second air inlet means and said second fuel injection means to operate in sequence during a cycle of one of said second and one of said first strokes in sequence.

4. A free-piston compressed gas generator comprising base means, cylinder means pivoted on said base means defining a chamber having an axis piston means reciprocable within said chamber along said axis between a first portion of said chamber and a second portion of said chamber, first exhaust means, first air inlet means, first fuel injection means and first exhaust means communicating with said first portion of said chamber, second air inlet means, second fuel injection means and second exhaust means communicating with said second portion of said chamber, and control means for sequencing the operation of said means in synchronism with cycles of first and second strokes of said piston means, said control means causing said first exhaust means, said first air inlet means and said first fuel injection means to operate in sequence during a cycle of one of said first and one of said second strokes in sequence and causing said second exhaust means, said second air inlet means and said second fuel injection means to operate in sequence during a cycle of one of said second and one of said first strokes in sequence, means providing a first manifold at one axial extreme portion of said chamber and means providing a second manifold at the other axial extreme portion of said chamber, said first air inlet means and said first fuel injection means communicating with said first manifold, said second air inlet means and said second fuel injection means communicating with said second manifold.

5. A free-piston compressed gas generator comprising base means, cylinder means constrained for motion on said base means defining a chamber, piston means reciprocable within said chamber between a first portion of said chamber and a second portion of said chamber, first exhaust means, first air inlet means, and first fuel injection means communicating with said first portion of said chamber, second air inlet means, second exhaust means and second fuel injection means communicating with said second portion of said chamber.

6. The free-piston compressed gas generator of claim 5 wherein said cylinder is mounted for arcuate motion about an axis removed therefrom.

7. The free-piston compressed gas generator of claim 6 wherein said axis is located effectively at the center of percussion of said first portion and said second portion.

8. The free-piston compressed gas generator of claim 1 wherein said cylinder is mounted for arcuate motion on said base.

9. The free-piston compressed gas generator of claim 2 wherein said cylinder is mounted for arcuate motion on a base.

References Cited in the file of this patent

UNITED STATES PATENTS

| | | |
|---|---|---|
| 1,036,288 | Matricardi | Aug. 20, 1912 |
| 1,858,102 | McKeown | Nov. 10, 1932 |
| 2,503,152 | Ekblom | Apr. 4, 1950 |
| 2,693,076 | Francis | Nov. 2, 1954 |
| 2,867,192 | Ettinger | Jan. 6, 1959 |